(12) United States Patent
Ho et al.

(10) Patent No.: US 7,370,280 B2
(45) Date of Patent: May 6, 2008

(54) APPARATUS, SYSTEM, AND METHOD FOR DEFINING A WEB SERVICES INTERFACE FOR MFS-BASED IMS APPLICATIONS

(75) Inventors: Shyh-Mei F. Ho, Cupertino, CA (US); Tony Y. Tsai, Ann Arbor, MI (US)

(73) Assignee: International Business Machines Corporation, Armonk, NY (US)

( * ) Notice: Subject to any disclaimer, the term of this patent is extended or adjusted under 35 U.S.C. 154(b) by 951 days.

(21) Appl. No.: 10/668,740

(22) Filed: Sep. 23, 2003

(65) Prior Publication Data
US 2005/0066284 A1    Mar. 24, 2005

(51) Int. Cl.
*G06F 3/00* (2006.01)
*G06F 3/01* (2006.01)

(52) U.S. Cl. .............. 715/762; 707/101; 707/102; 709/203; 709/246; 715/513; 719/319

(58) Field of Classification Search .............. 707/101, 707/102; 709/203, 246; 715/513, 762; 719/319
See application file for complete search history.

(56) References Cited

U.S. PATENT DOCUMENTS

| | | | | |
|---|---|---|---|---|
| 5,761,656 A * | 6/1998 | Ben-Shachar | ............... | 707/4 |
| 5,781,739 A * | 7/1998 | Bach et al. | ............... | 709/227 |
| 5,870,549 A | 2/1999 | Bobo | ............... | 709/206 |
| 5,899,975 A | 5/1999 | Nielsen | ............... | 704/270.1 |
| 5,960,200 A | 9/1999 | Eager et al. | ............... | 395/705 |
| 6,128,622 A | 10/2000 | Bach et al. | ............... | 707/103 |
| 6,141,660 A | 10/2000 | Bach et al. | ............... | 707/103 R |
| 6,212,550 B1 | 4/2001 | Segur | ............... | 709/206 |
| 6,243,737 B1 * | 6/2001 | Flanagan et al. | ............... | 709/202 |
| 6,250,309 B1 | 6/2001 | Krichen et al. | ............... | 128/899 |
| 6,253,200 B1 | 6/2001 | Smedley et al. | ............... | 707/4 |
| 6,256,676 B1 * | 7/2001 | Taylor et al. | ............... | 709/246 |

(Continued)

FOREIGN PATENT DOCUMENTS

JP      2001273177      10/2001

(Continued)

OTHER PUBLICATIONS

Cover, Robin et al. http://xml.coverpages.org/wscm.html, 2007.*

(Continued)

*Primary Examiner*—Weilun Lo
*Assistant Examiner*—Steven B. Theriault
(74) *Attorney, Agent, or Firm*—Kunzler & McKenzie

(57) ABSTRACT

An apparatus, system, and method are provided for defining a web services interface for an MFS-based IMS application. The apparatus, system, and method include a parser that parses an MFS-based IMS source file into one or more Message Input Descriptions (MIDs) and one or more Message Output Descriptions (MODs). A prompt module prompts a user for a device type and device feature combination supported by the MIDs and MODs. A display module displays a MID list and a MOD list and automatically selects one or more MODs associated with a user-selected MID. An assembly module assembles the user-selected MID, the associated MODs, and the user-selected device type and device feature combination into a web services interface.

30 Claims, 9 Drawing Sheets

U.S. PATENT DOCUMENTS

| | | | | |
|---|---|---|---|---|
| 6,259,447 | B1 | 7/2001 | Kanetake et al. | 715/764 |
| 6,289,382 | B1* | 9/2001 | Bowman-Amuah | 709/226 |
| 6,446,110 | B1 | 9/2002 | Lection et al. | 709/203 |
| 6,453,343 | B1 | 9/2002 | Housel et al. | 709/213 |
| 6,507,856 | B1 | 1/2003 | Chen et al. | 707/513 |
| 6,507,857 | B1 | 1/2003 | Yalcinalp | 715/513 |
| 6,510,466 | B1 | 1/2003 | Cox et al. | |
| 6,519,617 | B1 | 2/2003 | Wanderski et al. | 707/513 |
| 6,560,639 | B1 | 5/2003 | Dan et al. | 709/218 |
| 6,589,291 | B1 | 7/2003 | Boag et al. | 715/513 |
| 6,591,272 | B1 | 7/2003 | Williams | 707/102 |
| 6,601,071 | B1 | 7/2003 | Bowker et al. | 707/102 |
| 6,606,642 | B2 | 8/2003 | Ambler et al. | 709/200 |
| 6,613,098 | B1 | 9/2003 | Sorge et al. | 715/503 |
| 6,668,354 | B1 | 12/2003 | Chen et al. | 715/517 |
| 6,687,873 | B1 | 2/2004 | Ballantyne et al. | 715/500 |
| 6,728,685 | B1 | 4/2004 | Ahluwalia | 705/26 |
| 6,753,889 | B1 | 6/2004 | Najmi | 715/784 |
| 6,772,206 | B1 | 8/2004 | Lowry et al. | 709/223 |
| 6,775,680 | B2* | 8/2004 | Ehrman et al. | 707/102 |
| 6,799,299 | B1 | 9/2004 | Li et al. | 715/513 |
| 6,889,360 | B1 | 5/2005 | Ho et al. | 715/513 |
| 6,901,403 | B1 | 5/2005 | Bata et al. | 707/101 |
| 6,901,430 | B1 | 5/2005 | Smith | 709/206 |
| 6,904,598 | B2 | 6/2005 | Abileah et al. | 719/319 |
| 6,907,564 | B1 | 6/2005 | Burchhardt et al. | 715/513 |
| 6,910,216 | B2* | 6/2005 | Abileah et al. | 719/319 |
| 6,912,719 | B2 | 6/2005 | Elderon et al. | 719/319 |
| 6,915,523 | B2 | 7/2005 | Dong et al. | 719/319 |
| 6,948,174 | B2 | 9/2005 | Chiang et al. | 719/319 |
| 6,952,717 | B1 | 10/2005 | Monchilovich et al. | 709/205 |
| 6,964,053 | B2 | 11/2005 | Ho et al. | 719/319 |
| 6,971,096 | B1 | 11/2005 | Ankireddipally et al. | 718/101 |
| 6,980,963 | B1 | 12/2005 | Hanzek | 705/26 |
| 7,013,306 | B1* | 3/2006 | Turba et al. | 707/101 |
| 7,069,291 | B2* | 6/2006 | Graves et al. | 709/201 |
| 7,080,092 | B2 | 7/2006 | Upton | 707/102 |
| 7,130,893 | B2* | 10/2006 | Chiang et al. | 709/219 |
| 7,143,190 | B2 | 11/2006 | Christensen et al. | 709/246 |
| 2001/0014900 | A1 | 8/2001 | Brauer et al. | 707/513 |
| 2001/0047311 | A1 | 11/2001 | Singh | 705/26 |
| 2002/0010716 | A1 | 1/2002 | McCartney et al. | 707/517 |
| 2002/0035583 | A1 | 3/2002 | Price et al. | 707/513 |
| 2002/0038335 | A1 | 3/2002 | Dong et al. | 709/203 |
| 2002/0038336 | A1 | 3/2002 | Abileah et al. | 709/203 |
| 2002/0042849 | A1* | 4/2002 | Ho et al. | 709/329 |
| 2002/0046294 | A1 | 4/2002 | Brodsky et al. | 709/246 |
| 2002/0049815 | A1 | 4/2002 | Dattatri | 709/206 |
| 2002/0056012 | A1* | 5/2002 | Abileah et al. | 709/310 |
| 2002/0059344 | A1 | 5/2002 | Britton et al. | 707/513 |
| 2002/0078010 | A1 | 6/2002 | Ehrman et al. | 707/1 |
| 2002/0078255 | A1 | 6/2002 | Narayan | 709/316 |
| 2002/0083099 | A1 | 6/2002 | Knauss et al. | 707/513 |
| 2002/0099735 | A1 | 7/2002 | Schroeder et al. | 707/513 |
| 2002/0100027 | A1 | 7/2002 | Binding et al. | 717/137 |
| 2002/0111989 | A1 | 8/2002 | Ambler et al. | 709/202 |
| 2002/0116454 | A1 | 8/2002 | Dyla et al. | 709/203 |
| 2002/0133569 | A1 | 9/2002 | Huang et al. | 709/219 |
| 2002/0143820 | A1 | 10/2002 | Van Eaton et al. | 707/517 |
| 2002/0160745 | A1 | 10/2002 | Wang | 455/404 |
| 2002/0161801 | A1 | 10/2002 | Hind et al. | 707/513 |
| 2002/0174340 | A1 | 11/2002 | Dick et al. | 713/178 |
| 2002/0178290 | A1* | 11/2002 | Coulthard et al. | 709/246 |
| 2002/0178299 | A1 | 11/2002 | Teubner | 709/320 |
| 2002/0188688 | A1 | 12/2002 | Bice et al. | 709/206 |
| 2002/0194227 | A1 | 12/2002 | Day et al. | 707/523 |
| 2002/0198974 | A1 | 12/2002 | Shafer | 709/223 |
| 2003/0004746 | A1 | 1/2003 | Kheirolomoom et al. | 705/1 |
| 2003/0007397 | A1 | 1/2003 | Kobayashi et al. | 365/200 |
| 2003/0065623 | A1 | 4/2003 | Corneil et al. | 705/64 |
| 2003/0070006 | A1 | 4/2003 | Nadler et al. | 709/330 |
| 2003/0074217 | A1 | 4/2003 | Beisiegel et al. | 705/1 |
| 2003/0081002 | A1 | 5/2003 | De Vorchik et al. | 345/762 |
| 2003/0093403 | A1 | 5/2003 | Upton | 707/1 |
| 2003/0093436 | A1 | 5/2003 | Brown et al. | 707/103 |
| 2003/0093468 | A1 | 5/2003 | Gordon et al. | 709/203 |
| 2003/0093500 | A1 | 5/2003 | Khodabakchian et al. | 709/219 |
| 2003/0120730 | A1 | 6/2003 | Kuno et al. | 709/204 |
| 2003/0159111 | A1 | 8/2003 | Fry | 715/513 |
| 2003/0163585 | A1 | 8/2003 | Elderon et al. | 709/246 |
| 2003/0204460 | A1 | 10/2003 | Robinson et al. | 705/35 |
| 2003/0212686 | A1 | 11/2003 | Chu-Carroll et al. | 707/100 |
| 2004/0006739 | A1 | 1/2004 | Mulligan | 715/513 |
| 2004/0024820 | A1 | 2/2004 | Ozzie et al. | 709/205 |
| 2004/0030740 | A1* | 2/2004 | Stelting | 709/201 |
| 2004/0054969 | A1* | 3/2004 | Chiang et al. | 715/513 |
| 2004/0054970 | A1* | 3/2004 | Chiang et al. | 715/523 |
| 2004/0064466 | A1 | 4/2004 | Manikutty et al. | 707/100 |
| 2004/0103370 | A1* | 5/2004 | Chiang et al. | 715/513 |
| 2004/0111464 | A1* | 6/2004 | Ho et al. | 709/203 |
| 2004/0205731 | A1 | 10/2004 | Junkermann | 717/136 |
| 2004/0221292 | A1* | 11/2004 | Chiang et al. | 719/310 |
| 2004/0230987 | A1 | 11/2004 | Snover et al. | 719/320 |
| 2004/0237034 | A1 | 11/2004 | Chiang et al. | 715/513 |
| 2005/0050228 | A1* | 3/2005 | Perham et al. | 709/246 |
| 2005/0091639 | A1* | 4/2005 | Patel | 717/114 |
| 2005/0165826 | A1* | 7/2005 | Ho et al. | 707/102 |
| 2005/0166209 | A1 | 7/2005 | Merrick et al. | 719/310 |
| 2005/0171970 | A1 | 8/2005 | Ozzie et al. | 707/102 |
| 2005/0203944 | A1 | 9/2005 | Dinh et al. | 707/102 |
| 2005/0210414 | A1 | 9/2005 | Angiulo et al. | 718/838 |
| 2006/0265478 | A1 | 11/2006 | Chiang et al. | 709/219 |
| 2007/0083524 | A1* | 4/2007 | Fung et al. | 707/10 |
| 2007/0094283 | A1* | 4/2007 | Fung et al. | 707/101 |

FOREIGN PATENT DOCUMENTS

WO　　　WO 01/67290　　　9/2001

OTHER PUBLICATIONS

Jantti, Jouko et al. http://www-1.ibm.com/support/docview.wss?uid=swg27009024&aid=1, Feb. 2006.*

IBM et al. http://publibfp.boulder.ibm.com/epubs/pdf/hwsuga11.pdf, Oct. 2002.*

IBM et al. ftp://ftp.software.ibm.com/software/data/ims/toolkit/mfswebsupport/mfsxml-v3.pdf, 2003*

IBM et al. http://www.-306.ibm.com/software/data/ims/shelf/presentations/oneday/IMSeBusinessUpdate2003.pdf, 2003.*

IBM et al. http://publibfp.boulder.ibm.com/epubs/pdf/icgr0001.pdf, 2000.*

Cover, Robin et al. http://xml.coverpages.org/wsui.html, 2005.*

What Web Services Are NOT, www.webreference.com/xml/column_50, 2003.

Web Services, www.webopedia.com/TERM/W/Web_services.html, 2003.

XML and IMS for Transparent Application Integration, www-3.ibm.com/software/data/ims/presentations/four/vienna/html/indexp20.htm, 2003.

Creating WSDL and A Proxy Client From A Web Service, www.west-wind.com/webconnection/docs/_08413NI2E.htm, 2002.

Starkey, M., XML-Based Templates For Generating Artifacts From Java-Based Models, Research Disclosure v41 n416 Dec. 1998 Article 416103.

Rick Long, Mark Harrington, Robert Hain, and Geoff Nicholls, IMS Primer, www.redbooks.ibm.com pp. 147-152 and 157-168, 2000.

IMS Connector For Java User's Guide and Reference, Version 3.5 of IBM VisualAge for Java, pp. 1-5, 2002.

"NetDynamics, PAC for IMS" User Guide, Precise Connectivity Systems, 1998.

Microsoft Corp, Computer Dictionary, Third Edition, Microsoft Press, 1997, p. 371.

UML™ EAI. UML™ Profile and Interchange Models for Enterprise Application Integration (EAI). OMG document No. ad/Sep. 17, 2001.

"Web Services Description Language (WSDL) 1." Mar. 2001, W3C.
Extensible MarkupLanguage (XML) 1.0 (Second Edition) Oct. 2000, W3C.
"IMS Connect Guide and Reference version 1", Oct. 2000, IBM.
Long et al. "IMS Primer" Jan. 2000, IBM, Chapter 18.
"HostBridge and WebSphere: Integrating CICS with IBM's Application Server," a HostBridge White Paper, Jul. 23, 2002, pp. 1-34.
"S1215, WWW.IMS or Websphere Working with IMS," Ken Blackman, 39 p. (date unknown).
"Attunity Connect for Mainframe, Native OS/390 Adapters to Data and Legacy," 2003, pp. 1-3.
"Learning Management Systems XML and Web Services," Finn Gronbaek, IBM Corporation, copyright 2001, Apr. 20, 2003, pp. 1-29.
"Correlate IMSADF Secondary Transaction MFS Generation with the Generation of the Output Format Rule", IBM Technical Disclosure Bulletin, vol. 27, No. 1B, pp. 623-624, Jun. 1984.
"Remote Execution of IMS Transactions for OS/2", IBM Technical Disclosure Bulletin, vol. 34, No. 7B, pp. 16, Dec. 1991.
"Connecting to IMS Using XML, SOAP and Web Services", Shyh-Mei F. Ho. IMS technical Conference, Koenigswinter, Germany, Oct. 15-17, 2002.
"XML and IMS for Transparent Application Integration", Excerpt from http://www.3.ibm.com/software/data/ims/...ntations/two/imsv7enh/HTML/indexp50.htm. IBM Corporation, 2002.
"Web Services-The Next Step in the Evolution of the Web", Excerpt from http://www.3.imb.com/software/data/ims/...ntations/two/imsv7eng/HTML/indexp51.htm. IBM Corporation, 2002.
"Leveraging IMS Applications and Data" <Excerpts from Leveraging IMS2 found at http://www.3.ibm.com/software/data/ims/...ntations/two/imsv7eng/HTML/indexp52.htm IBM Corporation, 2002.
"What's Next in IMS Providing Integrated e-business Solutions: IMS Version 8", Excerpt from http://www.3.ibm.com/software/data/ims/...ntations/two/imsv7eng/HTML/indexp53.htm IBM Corporation, 2002.
"IMS Follow-on Ideal for e-business", Excerpts from http://www.3.ibm.com/software/data/ims/...ntations/two/imsv7enh/HTML/indexp55.htm IBM Corporation, 2002.

"IMS Information", Excerpts from http://www.3.ibm.com/software/data/ims/...ntations/tow/imsv7eng/HTML/indexp55.htm IBM Corporation, 2002.
Application Development/Enablement, http://www.306.ibm.com/software/data/ims/presentation/five/trends2003/HTML/indexp15htm Nov. 11, 2002.
Hofstetter, The Future's Future: Implications of Emerging Technology for Special Education Program Planning, Journal of Special Education Technology, Fall 2001, vol. 16, p. 7, 7 pgs.
Diaz et al., Inter-Organizational Document Exchange - Facing the Conversion Problem with XML, ACM 2002, pp. 1043-104.
Arndt et al., An XML-Based Approach to Multimedia Software Engineering for Distance Learning, ACM 2002, pp. 525-532.
Glushko et al., An XML Framework for Agent-Based E-Commerce, ACM Mar. 1999, pp. 106-114.
Dymetman at al., XML and Multilingual Document Authoring: Convergent Trends, ACM Jul. 2000, pp. 243-249.
PR Newswire, XML Solutions Delivers XML-based Prototype for Envera Marketplace, ProQuest, Apr. 2000, pp. 1-3.
Suzuki et al., Managing the Software Design documents with XML, ACM 1999, pp. 127-136.
Stieren, SST; Using Single-sourcing, SGML, and Teamwork for Documentation, ACM 1999, pp. 45-52.
Royappa. Implementing Catalog Clearinghouses with XML and XSL, ACM 1998, pp. 616-623.
Absa Uses VGR to Ensure Online Availability, www-306.ibm.com/software/data/ims/quarterly/Winter2000/winter.htm. Feb. 10, 2005.
"IBM Mainframe," www.dmreview.com/whitepaper/WID1002720.pdf, Mar. 18, 2005.
James Martin, "principles of Object-Oriented Analysis and Design", Oct. 29, 1992, Chapters 1-22.
"Quarterdeck Mosaic User Guide", 1995, Chapters 1-7.
Component of the Week: XMI Toolkit:, Jun. 1, 2001 http://www-106.ibm.com/developerworks/library/co-cow21.html.

* cited by examiner

APPARATUS, SYSTEM, AND METHOD FOR DEFINING A WEB SERVICES INTERFACE FOR MFS-BASED IMS APPLICATIONS

BACKGROUND OF THE INVENTION

1. Field of the Invention

The invention relates to web services. Specifically, the invention relates to apparatus, systems, and methods for defining a web services interface for MFS-based IMS applications.

2. Description of the Related Art

Computer and information technology continues to progress and provide tools that allow software applications to interact more easily than in the past. For example, web services have been introduced recently as a standard interface allowing one software application to utilize a feature or function of another software application over a public network without obstacles such as proprietary message formats, encoding, firewall access, and the like.

To control costs, web services need to interface with other computer and information technology which remain largely unchanged. For example, large corporations, governments, and other entities continue to use legacy applications, software programs designed, written, and maintained for large, mission-critical computers, such as mainframes. These entities have invested large amounts of work and money into developing and maintaining the legacy applications. In addition, these applications have been tested and refined to operate very efficiently and with minimal errors.

Legacy applications continue to manage a high percentage of the everyday transactions and data for these businesses. One example of legacy applications in wide-spread use are Message Format Service-based Information Management System applications (hereinafter MFS-based IMS applications). MFS is a component of the transaction management module for IMS. MFS translates transaction messages between various devices and the MFS-based IMS application.

Converting or upgrading MFS-based IMS applications to the latest technologies and standards, such as web services, is often costly and/or impractical. Instead, components are built to translate messages between software applications executing modern standards and technologies and the MFS-based IMS applications.

For example, XML-MFS adapters have been built which convert between web services messages utilizing eXtended Markup Language (XML) and Simple Object Access Protocol (SOAP) and proprietary transaction messages used by MFS-based IMS applications. In this manner, MFS-based IMS applications benefit from the new standards and technologies without making any changes to the MFS-based IMS applications themselves.

Proprietary transaction messages used by MFS-based IMS applications insulate the MFS-based IMS application from the differences in characteristics and layout among different device types and device features that cooperate to provide an interface for the MFS-based IMS application. The devices interfacing with MFS-based IMS applications may include hardware and software including different terminals, keyboards, mouse devices, monitors, light pens, touch screens, card readers, and the like. Instead of device specific code in each MFS-based IMS application, a common MFS control block known as a Message Input Description (MID) and Message Output Description (MOD) is defined for the different device types.

The MID and MOD define how the input or output messages are formatted and laid out for the specific input/output device. MFS supports a plurality of devices including the IBM 3270 terminal. MFS uses the MIDs/MODs to manage interface information such as field formats, field layouts, input devices, and the like. Because MFS manages the interface specific information, the MFS-based IMS application may focus on business logic that utilizes the inputs and outputs.

As mentioned above, XML-MFS adapters allow non-MFS based IMS applications to interface with MFS-based IMS applications for implementing e-commerce software such as web services. Non-MFS based IMS applications send XML messages to the XML-MFS adapter, which provides messages in the MID/MOD format to the MFS-based IMS application. However, MFS-based IMS applications typically support a large number of devices, which means that a corresponding large number of MIDs/MODs are defined. The XML-MFS adapter needs to know which MID and associated Device Input Formats (DIFs) and which MODs and associated Device Output Formats (DOFs) define an application interface for the MFS-based IMS application providing the web service.

This MFS-based IMS application interface may be defined in an XMI (XML Metadata Interchange) file. The XML-MFS adapter uses the XMI files to convert an XML message from a non-MFS based IMS application, such as a servlet, Java bean, or SOAP client application, into the appropriate MFS input and output messages to communicate with the MFS-based IMS application.

Using XMI files, the XML-MFS adapter performs the run-time conversion of XML messages into suitable MID/DIF and MOD/DOF messages and vice versa. In addition, a code generation tool may use XMI files to build a servlet implementing a web service on a web server. Furthermore, a web services description tool uses the XMI files to produce a description of the web service suitable for a web services directory such as a Uniform Description, Discovery, Integration (UDDI) directory. The web services description tool formats the web services description into a Web Services Description Language (WSDL) file.

Unfortunately, no user tools exist for building suitable XMI files to define the web services application interface for an MFS-based IMS application. XMI files may be written manually using a text editor, though such a process is time consuming, error prone, and requires the author to have intimate knowledge regarding the MID and associated MODs supported by the MFS-based IMS application that the XMI files are intended to represent. Furthermore, the author must know which required MODs to include in the XMI files. In addition, the author must now how a desired MID for implementing the web service is associated with one or more MODs.

Accordingly, what is needed is an apparatus, system, and method for defining a web services interface for an MFS-based IMS application. In particular, the apparatus, system, and method should automate the generation of XMI files that define a web services interface for an MFS-based IMS application that includes a user-selected MID, one or more associated MODs, and any required MODs. To be most beneficial the apparatus, system, and method should also allow a MID/MOD selection for preexisting XMI files to be readily revised.

BRIEF SUMMARY OF THE INVENTION

The present invention has been developed in response to the present state of the art, and in particular, in response to the problems and needs in the art that have not yet been met for defining a web services interface for an MFS-based IMS application. Accordingly, the present invention has been developed to provide an apparatus, system, and method for defining a web services interface that overcome many or all of the above-discussed shortcomings in the art.

An apparatus according to the present invention includes a parser, a prompt module, a display module, and an assembly module. The parser parses an MFS source file into one or more MID/DIF pairs and one or more MOD/DOF pairs. MFS source files may be local or imported from a remote storage location. In the case when MFS source files have already been parsed, it is possible to define a web service interface without re-invoking the parser. The prompt module prompts a user for a device type and device feature combination supported by the MIDs and MODs.

The display module displays a list of MIDs and a list of MODs defined in the MFS source file or in pre-existing XMI files. In addition, the display module automatically selects MODs that are associated with a user-selected MID. The display module may automatically select required MODs as well. In certain embodiments, the display module automatically selects the first logical page of a user-selected MID. Furthermore, the display module may order the MIDs in the MID list and MODs in the MOD list. The assembly module assembles the user-selected MID, associated MODs, and a user-selected device type and device feature combination into a web services interface. The web services interface may comprise a WSDL file.

In addition, the apparatus may include a generator that generates XMI files for the MIDs/MODs associated with a selected device type and device feature combination. A filter module may also filter the list of MIDs and list of MODs in response to user-defined criteria. A format module may format the source file in response to a user-defined encoding format.

A user interface of the present invention is provided for defining a web services interface for an MFS-based IMS application. The user interface includes a first selection module, a second selection module, and a designation module. The first selection module prompts a user to select a source file defining MIDs and MODs for an MFS-based IMS application. The second selection module prompts a user to select a device type and associated device feature. The designation module prompts a user to designate a MID and one or more MODs for a web services interface for the MFS-based IMS application.

A method of the present invention is also presented for defining a web services interface for an MFS-based IMS application. In one embodiment, the method includes parsing an MFS-based IMS application source file into one or more MIDs and one or more MODs. Next, a user may be prompted for a device type and device feature combination supported by the MIDs and MODs. Then, a MED list and a MOD list is displayed. The MID list and MOD list contain MIDs and MODs defined in the source file. Preferably, selection of a MID in the MID list causes associated MODs to also be selected. Finally, a user-selected MID, logical page of the MID, associated MODs, and a user-selected device type and device feature combination are assembled into a web services interface.

The features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
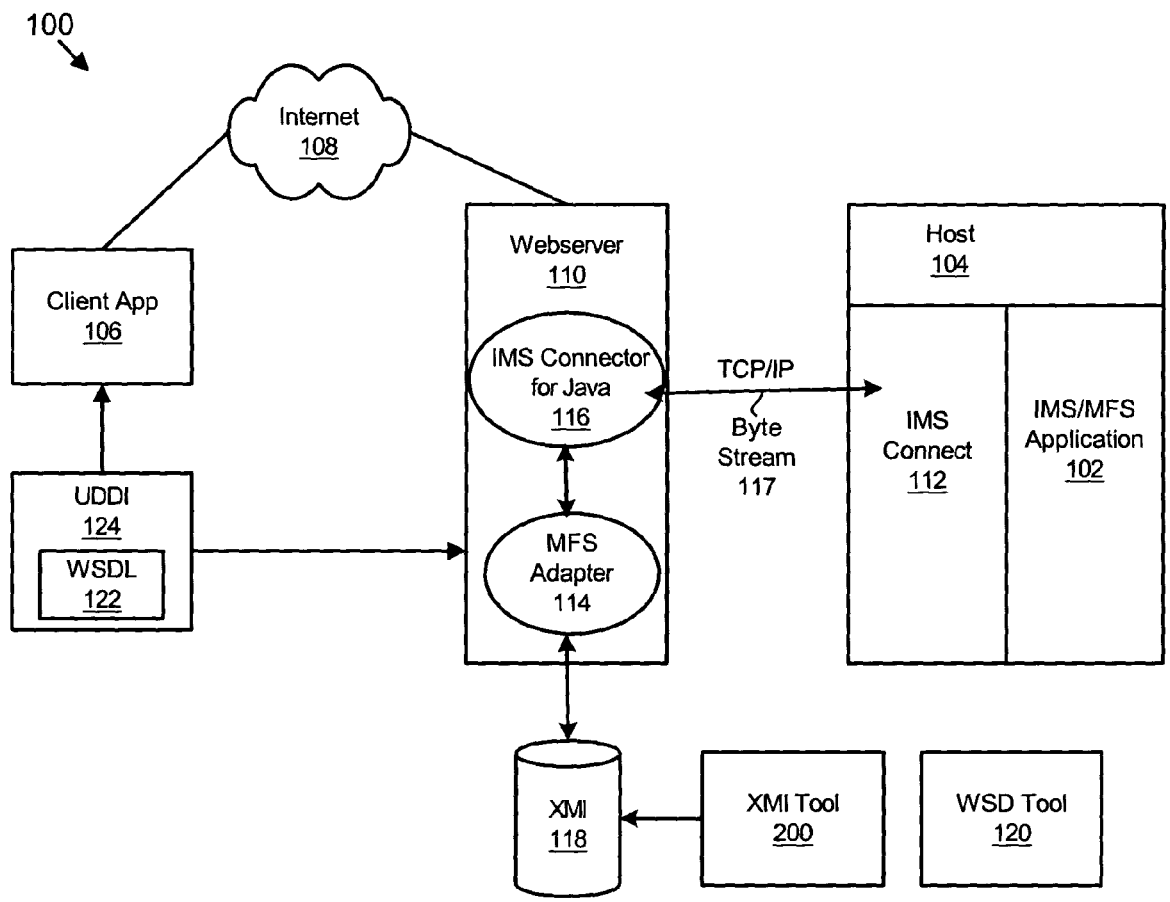
FIG. 1 is a schematic block diagram illustrating one embodiment of a representative system suitable for utilizing the present invention.

It will be readily understood that the components of the present invention, as generally described and illustrated in the figures herein, may be arranged and designed in a wide variety of different configurations. Thus, the following more detailed description of the embodiments of the apparatus, system, and method of the present invention, as represented in FIGS. 1 through 7, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, function, or other construct. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

FIG. 1 illustrates a schematic block diagram of one embodiment of a representative system 100 suitable for utilizing the present invention. The system 100 depicts a run-time environment that includes a web services interface for a MFS-based IMS application 102. The MFS-based IMS application 102 operates within a host 104.

Typically, the host 104 is a mainframe computer operating a mainframe operating system such as Multiple Virtual Storage (MVS) or OS/390. Alternatively, the host 104 may comprise a computer system running the zSeries/Operating System (z/OS). As mentioned above, the MFS-based IMS applications 102 are typically older, more mature software applications that provide mission-critical operations for a business, government, or organization. The MFS-based IMS application 102 completes transactions and communicates with users of terminal devices such as the IBM 3790 (not shown) by way of MID and MOD messages.

Recently, components have been built which allow the MFS-based IMS application 102 to interface with client applications 106 over the Internet 108 to enable web services. The MFS-based IMS application 102 continues to use MID and MOD messages with associated device information. The client applications 106 use modern technologies such as XML and SOAP messages. The client applications 106 may be XML, SOAP, or Enterprise Java Beans (EJB) clients.

Web services represent an evolution in e-business and e-commerce. Web services characterize all functions as a service that can be dynamically discovered and orchestrated using messaging on a network. Businesses can dynamically sell their services to others by publishing their applications as web services.

Web services are self-contained modular applications that can be described, published, located and invoked over a network. Web services can reside locally, be distributed or Web-based. Web services may interact with and/or invoke each other, to fulfill specific tasks and requests that, in turn, may carry out specific parts of complex transactions or workflows.

Web services typically comprise a single transaction initiated by an initial request that includes input data. MFS-based IMS applications 102 are typically configured to operate on a transaction model. Accordingly, MFS-based IMS application 102 may provide a wide range of pre-built web services so long as the MFS-based IMS application 102 is able to communicate with the client application 106. The web services interface defines how client applications 106 may communicate with a MFS-based IMS application 102 to use a web service.

In one embodiment, the system 100 may include a web server 110, IMS connect component 112, an XML-MFS adapter 114, and an XMI tool 200. The web server 110 communicates messages between client applications 106 and an MFS-based IMS application using IMS connector for Java 116 and the XML-MFS adapter 114 using conventional protocols, such as Hypertext Transfer Protocol (HTTP), XML, SOAP, and the like. Typically, the web server 110 executes a IMS connector for Java 116 which is designed to establish connectivity between the web server 110 and an IMS connect component 112.

The XML-MFS adapter 114 converts XML messages received from the client application 106 into MFS messages. The XML-MFS adapter 114 supports SOAP, EJB, and Java inbound bindings such that MFS-based IMS applications may provide web services. The MFS messages are communicated to the IMS connect component 112 as a byte stream 117. The IMS connect component 112 provides the byte stream to the MFS-based IMS application 102.

The byte stream communicated to the MFS-based IMS application 102 is formatted according to a specific MID, and an output byte stream from the MFS-based IMS application 102 corresponds to one or more MODs. In order to properly format and parse the byte stream, the XML-MFS adapter 114 uses XMI files 118.

Typically, XMI files 118 reside within a repository, such as a database or a location on a storage device. The XMI files 118 define how data, data fields, and data types map between an XML file and an MFS XML file. The MFS XML file includes data formatted for a specific MID. The MFS XML file also includes data formatted for one or more MODs associated with the specific MID.

XMI files 118 include a MID and a corresponding DIF, at least one MOD and a corresponding DOF, and an MFS table. Accordingly, the XML-MFS adapter 114 may access as many as three different XMI files 118 to provide translation of an XML file into an MFS XML file. As used herein, XMI files 118 refer to a type of XMI file organized specifically for MFS. XMI files 118 describe messages definitions, device definitions, and the relationships between them for handling MFS messages.

Conventionally, a software developer would build the XMI files manually. To do so, the developer (hereinafter referred to as the user) should have very specific knowledge of the format and definition of a desired MID/DIF, one or more MOD/DOFs, and MFS table. In addition, the user should know the syntax and formatting requirements to write proper XMI files. Consequently, the user should have expertise in both the new technology and the old technology. Such expertise is difficult to find, and the manual programming requirement is error prone.

Because XMI files 118 define the MID/MOD interface understood by MFS-based IMS applications 102, the XMI files 118 also define a web services interface for the client applications 106 to interact with the MFS-based IMS applications 102. From XMI files 118, other tools such as IBM WebSphere Studio may automatically generate web services components, such as servlet 116 for the MFS-based IMS application 102.

In addition, a web services description (WSD) tool 120 may read the XMI files 118 to define one or more MFS WSDL files 122 that describe the web services interface on a UDDI 124. The web services description tool 120 generates MFS WSDL files 122 for a particular MID/MOD(s) pair. The WSDL standard is an XML format for describing the network services that handle procedural or document-oriented information. These descriptions define endpoints that are bound to a particular network protocol. WSDL is used to express business services in a UDDI 124 registry.

According to selected embodiments of the present invention, the MFS WSDL files 122 contain only device information. For the input part of a WSDL message, only device fields which map to input message fields will be used; and on the output side, only device fields which map to output message fields will be used.

Selected embodiments of the present invention provide an XMI tool 200. The XMI tool 200 is used to generate the XMI files 118. The XMI files 118 may then be used by the web services description tool 120 and/or a XML-MFS adapter 114 to provide web services at run time.

Figure 2:
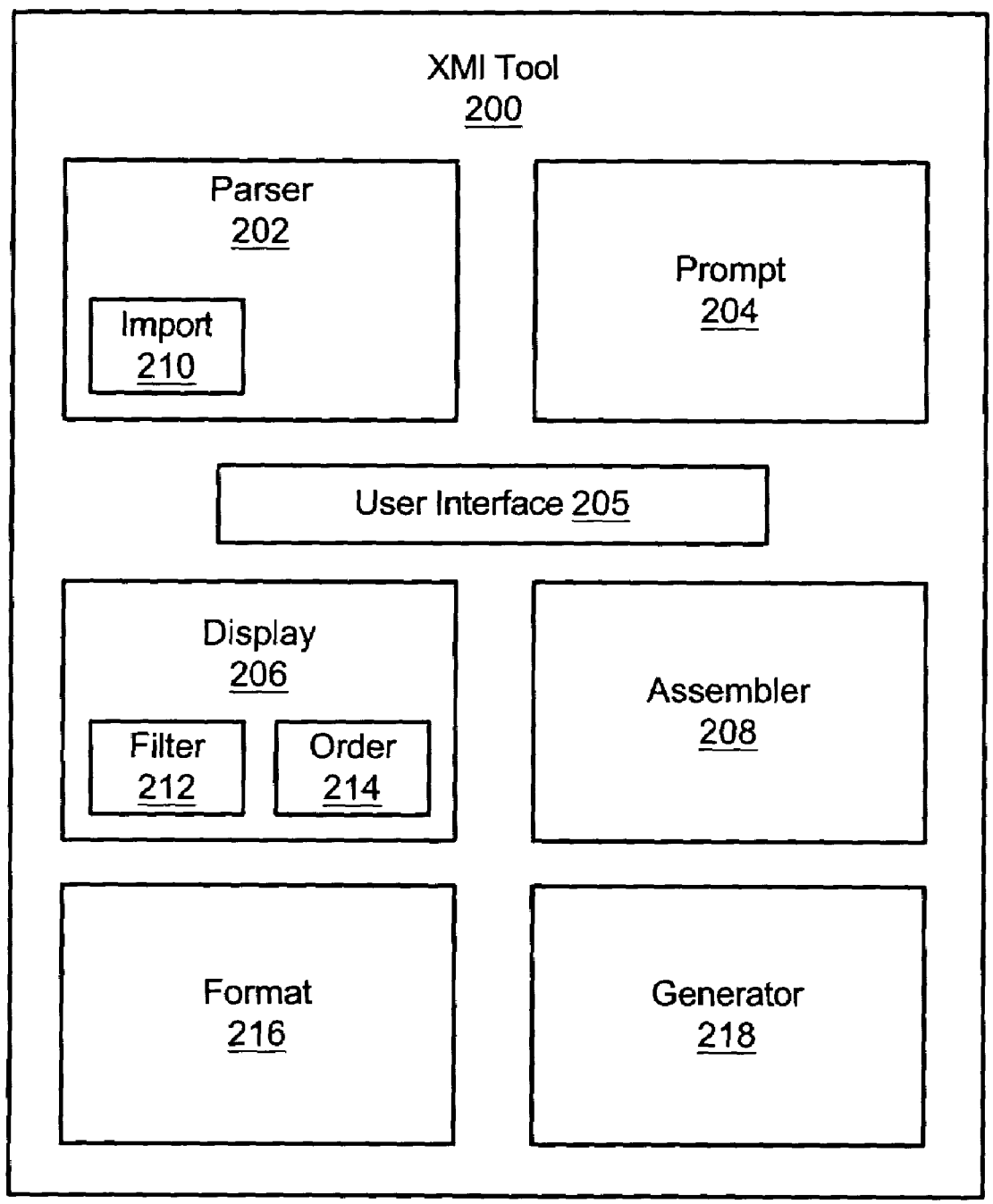
FIG. 2 is a schematic block diagram illustrating one embodiment of an apparatus in accordance with the present invention.

FIG. 2 illustrates a schematic block diagram of one embodiment of an XMI tool 200 in accordance with the present invention. The XMI tool 200 includes a parser 202, a prompt module 204, a user interface 205, a display module 206, and an assembly module 208. These components cooperate to assist a user in generating XMI files 118 that describe the MFS-based IMS application interface (a web services interface).

The parser 202 is configured to parse an MFS source file into one or more MIDs and one or more MODs. The parser 202 may read the MFS source file from a local storage device and define the MIDs and MODs in memory (not shown). Alternatively or in addition, the parser 202 may include an import utility 210 configured to import MFS source files from a remote storage device, such as a hard drive accessible over a network. Preferably, the parser 202 is configured to parse a plurality of MFS source files to accommodate MFS MIDs and MODs that are stored in multiple MFS source files.

The parser 202 comprises a symbol table (not shown) and grammar (not shown) suitable for properly identifying the MIDs/DIFs and MODs/DOFs as well as associations between them. Preferably, the MIDs/DIFs and MODs/DOFs are organized into data structures in memory such as software objects, arrays, linked lists, or the like. The parser 202 also stores associations between MIDs/DIFs and MODs/DOFs in memory. The associations between MIDs/DIFs and MODs/DOFs are defined in the MFS source files.

MIDs and MODs relate to one or more specific device types. In a mainframe environment, the MIDs and MODs allow a single MFS-based IMS application to perform transactions for end-users of different hardware device types, including terminals, desktop computers, workstations, and the like. Alternatively, MIDs/MODs may be defined to provide different layouts for data fields.

Each MID and MOD has a corresponding Device Input Format (DIF) and Device Output Format (DOF). The DIF/DOF respectively define characteristics about the specific input devices and output devices. The input devices and output devices comprise components such as specific types of keyboards, mouse devices, monitors, light pens, touch screens, card readers, and the like. The peripheral input devices and output devices associated with a type of end-user device type are referred to as device features. A specific device type and device feature comprise a device type and device feature combination.

The prompt module 204 prompts a user for a device type and device feature combination. In one embodiment, the device types and device features presented to a user by the prompt module 204 are those that are supported by the MIDs and MODs of the MFS source file(s). The prompt module 204 may present the device types and device features in list boxes of the user interface 205.

The display module 206 displays a MID list and a MOD list. Preferably, the MID list and MOD list respectively list MIDs/MODs that are associated with the device type and device feature combination selected by the user. Alternatively, the MID list and MOD list may list all the MIDs/MODs identified in the MFS source files.

Preferably, the display module 206 is configured to cooperate with the user interface 205 such that user-selection of a MID in the MID list causes the display module 206 to automatically select one or more associated MODs. In addition, the display module 206 may automatically select one or more MODs that are required to handle certain output messages from the MFS-based IMS application. For example, the required MODs may correspond to error messages provided by the MFS-based IMS application.

In defining a web service for an MFS-based IMS application, a user is preferably restricted to a single MID. Preferably, the display module 206 enforces this restriction. Selection of a different MID in one embodiment de-selects a selected MID and any selected MODs and selects the MODs associated with the newly selected MID.

In one embodiment, the display module 206 includes a filter module 212 and an order module 214. The filter module 212 may filter the MID list and/or the MOD list based on a user-defined criteria. The order module 214 may order the MIDs/MODs according to some ordering criteria. In one embodiment, the MIDs/MODs are ordered alphabetically.

The assembler 208 assembles the user-selected MID, associated MODs, and user-selected device type and device feature combination into a web services interface. In one embodiment, the assembler 208 identifies the XMI files for the user-selected MID and associated MODs that support the selected device type and device feature combination. These XMI files may be assembled into a common directory or other storage location. As mentioned above, the XMI files may then serve as input to other tools that service web services requests and/or generate a WSDL file describing the web service generally and web service interface provided by the MFS-based IMS application.

Optionally, the XMI tool 200 may also include a format module 216 and a generator 218. MFS source files may be stored on computers that use different types of file encoding. Consequently, in order to parse the MFS source file(s), certain MFS source files may need to be formatted to the encoding format recognized by the parser 202. Preferably, the format module 216 allows a user to specify an encoding format. Based on the encoding format, the format module 216 formats the MFS source files to a common encoding format as needed.

The generator 218 generates XMI files 118 for the MIDs and MODs supported by the selected device type and device feature combination. Alternatively, XMI files 218 may be generated by the generator 218 or another tool for all MIDs and MODs in the MFS source files. The set of all the XMI files 118 may then be reduced to the set corresponding to the user-selected MID and MODs and device type and device feature combination by the assembler 208.

Figure 3:
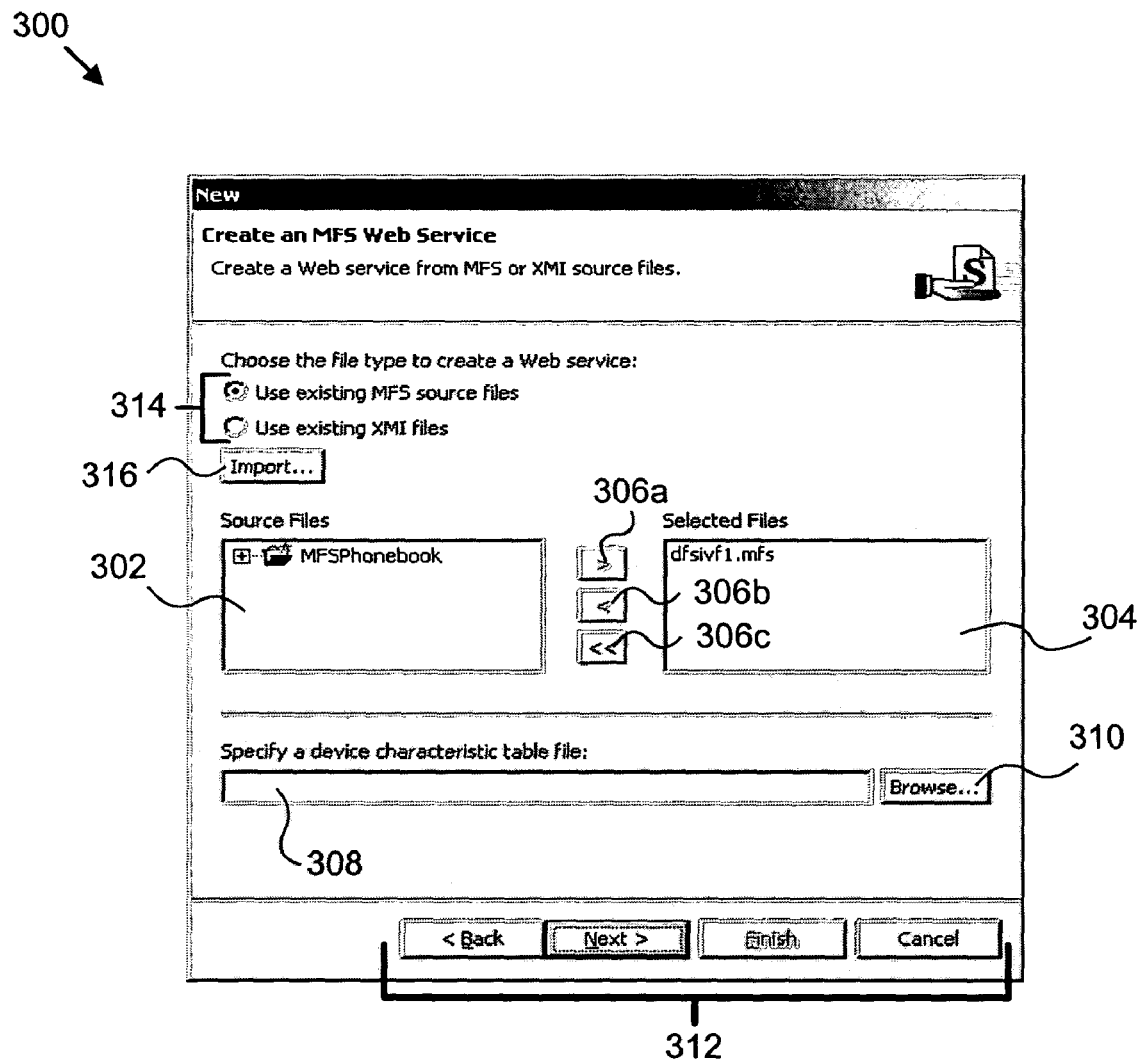
FIG. 3 is a schematic block diagram illustrating a first selection module of a user interface in accordance with the present invention.

FIG. 3 illustrates one example of a first selection module 300 for a user interface in accordance with the present invention. The first selection module 300 may be generated by the user interface 205 of FIG. 2. FIGS. 4-6B illustrate additional components and modules that may be displayed by the user interface 205 in implementing the present invention. Those of skill in the art will recognize that the display modules generated by the user interface 205 may be implemented in various manners consistent with the features and functionality of the embodiments depicted in FIGS. 3-6B. Accordingly, in certain embodiments, different input boxes, edit boxes, pick lists, radio buttons, control buttons, selection/de-selection schemes, windows, screens, window panes, and the like may be used within the scope of the present invention. In addition, the information gathered and/or presented to a user may be divided into more or fewer windows or modules than those depicted herein.

FIG. 3 illustrates a first selection module 300 in the form of a window implemented as part of a graphical user interface (GUI). Alternatively, the first selection module 300 and others discussed below may be implemented in a command line interface, a text screen interface, or the like without departing from the substance of the present invention. In one embodiment, the first selection module 300 and other components and modules illustrated in FIGS. 4-6B may be organized as a wizard. The term "wizard" refers to a software program, or module within another software program, designed to collect information from a user and guide the user in accomplishing an end goal. In the present invention, the end goal is generation of the XMI files 118 and collection of the information needed to define a web services interface for an MFS-based IMS application 102.

The first selection module 300 prompts a user for one or more MFS source files. The MFS source files define MIDs/DIFs and MODs/DOFs for a particular MFS-based IMS application. The first selection module 300 may include a selection pane 302 and a selected pane 304. The selection pane 302 lists a storage device, such as a hard drive or folder, that holds one or more MFS files. In one embodiment, the user may navigate between storage devices and/or folders to locate the appropriate MFS source files.

Once located, the MFS source files may be selected by highlighting the name listing of the file in the selection pane 302. Preferably, a user may select multiple files listed in the selection pane 302. Next, a user may activate one of the selection control buttons 306*a-c*. For example, activation of a control button 306*a* may cause one or more highlighted MFS file name listings to appear within the selected pane 304. MFS files listed in the selected pane 304 are those that are currently selected. Similarly, activation of a control button 306*b* may cause any highlighted MFS files in the selected pane 304 to disappear. Activation of a control button 306*c* may cause all MFS files in the selected pane 304 to disappear. Alternatively, MFS files may be selected/deselected by dragging and dropping the MFS file names between the selection pane 302 to the selected pane 304.

Optionally, for certain MFS source files, a user may designate a device characteristic table file. This file overrides the screen size definitions provided for certain MIDs and MODs of the MFS source file. Accordingly, the first selection module 300 includes an edit box 308 and navigation button 310 that allow the user to optionally type in the file name and path to the device characteristic table file, or to select the device characteristic table file from a file explorer tool activated by the navigation button 310.

The first selection module 300 includes control buttons 312 that allow a user to navigate between different windows of the user interface. Preferably, the finish button and the next button are not activated until a user has provided all of the information requested. For example, the next button may be grayed out (disabled) until a user provides at least one selected MFS source file.

In certain embodiments, the first selection module 300 may include a radio button 314 that allows the user to specify whether the user interface is to use existing MFS source files or existing XMI files. If a user selects "Use existing XMI files," the selection pane 302 and selected pane 304 may be grayed out and deactivated, and the user interface may continue with a designation module, described in more detail below. The user may desire to use existing XMI files if a previously selected device type and device feature is acceptable and a user desires to define another web service interface.

In another embodiment, the first selection module 300 includes an import button 316. The import button 316 allows a user to retrieve MFS source files from storages devices and locations outside the environment executing the user interface. For example, the import button 316 may activate a file transfer application, such as an File Transfer Protocol (FTP) application, that allows a user to connect to a mainframe computer and fetch one or more MFS source files. The retrieved MFS source files may be stored in a local directory accessible using the selection pane 302.

Figure 4:
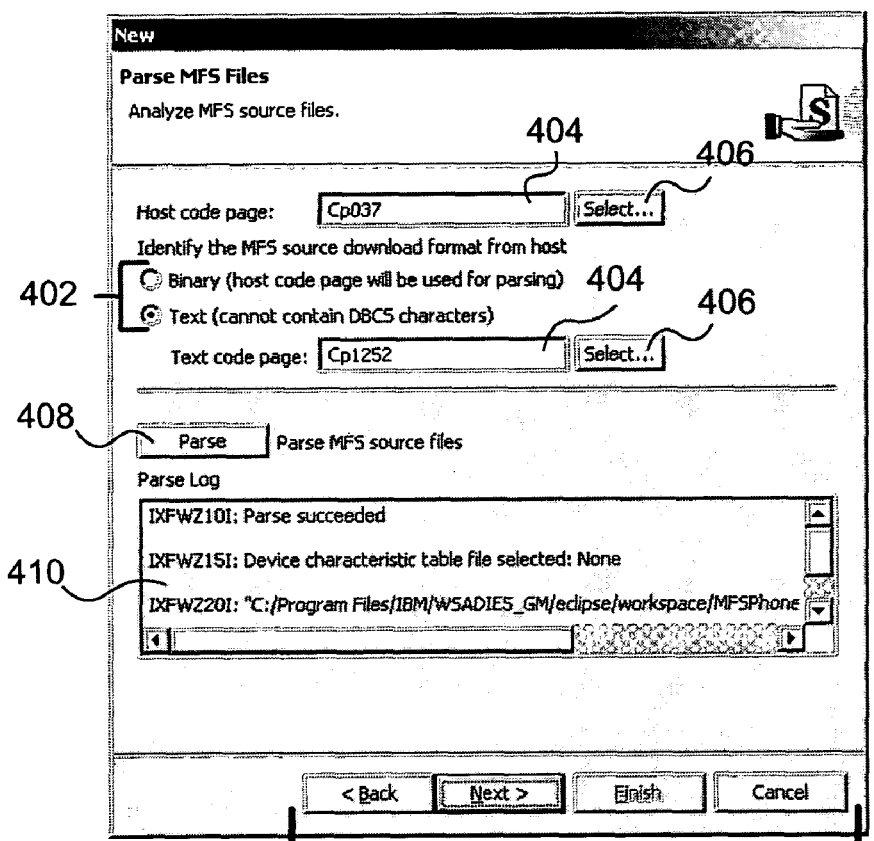
FIG. 4 is a schematic block diagram illustrating a format module of a user interface in accordance with the present invention.

If a user selects MFS source files instead of XMI files, the user interface presents a format module 400 illustrated in FIG. 4. The format module 400 parses the selected MFS source files and generates MIDs/MODs in memory defined in the selected MFS source files.

MFS source files reside on the host 104. A user interface implementing the present invention may operate on a PC or workstation. Accordingly, the MFS source files may be transferred to the PC or workstation using a file transfer program such as FTP which may impose an encoding change on the MFS source files from the original format on the host 104.

Text characters on a host 104 are typically encoded using the Extended Binary Coded Decimal Interchange Code (EBCDIC). In contrast, a PC or workstation typically encodes text characters according to American National Standard Code for Information Interchange (ASCII) code. Consequently, if a binary file is translated into a text file and then transferred from a host 104 to a PC, the text file is now in ASCII format. If an ASCII format file is parsed as an EBCDIC encoded file, the results are dramatically different.

So, the format module 400 allows the user to indicate whether the MFS source files have undergone an encoding change using the Binary/Text radio button 402. If the MFS source files have been transferred in text format, the user should indicate this by selecting the text portion of the Binary/Text radio button 402. In addition, the user should indicate the encoding format used by the host 104 as well as the encoding format used if the MFS source files have been converted to text. The encoding formats are defined in code pages.

Edit boxes 404 allow the user to identify the code page on the host 104 and, optionally, the code page used to produce the text version of the MFS source files. In one embodiment, the format module 400 may allow a user to select code pages from a pick list (not shown) in response to activation of one of the selection buttons 406. Code pages may represent, not only different encoding between types of computers, but also different encoding of text for natural languages such as English and Russian.

Once one or more code pages are designated, a parse button 408 is made available. A user may select the parse button 408 to begin parsing the MFS source files. The format module 400 or another component may then parse the MFS source files. Parsing of the MFS source files comprises defining MID/MOD data structures in memory based on the MID/MOD definitions in the MFS source files.

During the parsing process, certain errors may stop the parsing process, for example, if the MFS source file is encoded using a code page different from the one identified by the user. To assist a user in diagnosing and resolving parsing errors, the format module 400 includes a parse log pane 410. The parse log pane 410 reports on the status of the parsing process. If a parsing error occurs, the parse log pane 410 may indicate what may have caused the error. The user may then make an adjustment, such as selecting a different code page and re-parsing the MFS source files. In certain embodiments, messages reported in the parse log pane 410 may also be stored in a parse log file (not shown). If the parsing process is successful, the next control button 312 may be enabled such that a user may activate the next control button 312 to continue.

Certain embodiments may not include a format module 400. Instead, a user may be required to transfer MFS source files to/from a host 104 using a binary file format. In addition, code page "CP037" may be the only one supported. Once a user activates the next control button 312 of the first selection module 300, the MFS source files may be automatically parsed. A parse log file may be generated and the user interface may report any parsing errors. If a parsing error occurs in this embodiment, the user would re-start the user interface and re-select the MFS source files to prevent the parsing error. If parsing is successful, the user interface may continue as illustrated in FIG. 5.

Figure 5:
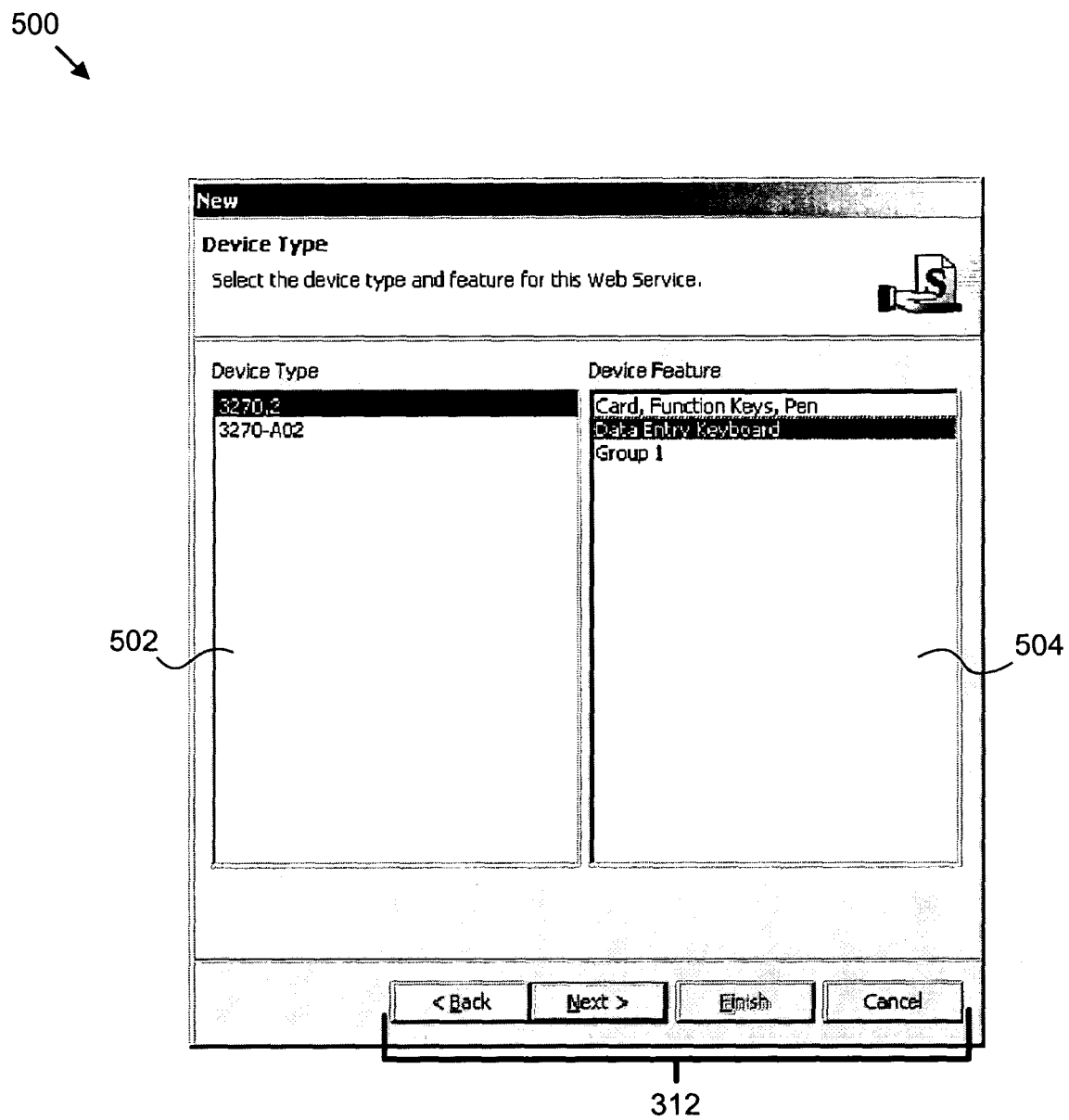
FIG. 5 is a schematic block diagram illustrating a second selection module of a user interface in accordance with the present invention.

FIG. 5 illustrates a second selection module 500 configured to prompt a user to select a device type and associated device feature supported by the MIDs/MODs defined in the MFS source files. The second selection module 500 includes a device type pane 502 and a device feature pane 504. In one embodiment, the user interface determines the device types that are listed in the device type pane 502 from the MIDs/MODs loaded in memory. Similarly, device features associated with a device type are listed in the device feature pane 504.

A user selects a device type by highlighting the device type name listed in the device type pane 502. In one embodiment, the first device type and first associated device feature are automatically selected when the second selection module 500 is presented. In another embodiment, selection of a device type causes the listing of device features to change to match the selected device type. Preferably, the second selection module 500 permits the user to select only one device type and only one associated device feature. Once a device type and device feature are selected, the next control button 312 is enabled and a user may continue.

Once the user continues, the user interface may activate a generator that generates the XMI files. Preferably, the XMI files correspond to a subset of all the MIDs/MODs defined in the MFS source files. The subset of MIDs/MODs are those that support the selected device type and device feature (the display environment). Alternatively, the generator may not be activated until a user has designated a single MID and associated MODs. MFS source files may include hundreds of MIDs/DIFs and MODs/DOFs. Consequently, the selection of a device type and device feature may significantly reduce the number of MIDs/MODs that may be candidates for defining the web services interface. From the set of XMI files, a plurality of web services interfaces may be defined for the selected device type and device feature.

As mentioned above, the user interface may be re-executed and pre-existing XMI files 314 designated. If pre-existing XMI files are designated, the user interface may skip the format module 400 and second selection module 500. The user interface continues with the designation module 600 discussed below. With pre-existing XMI files and information collected from the designation module 600 a new web services interface may be defined.

Figure 6A:
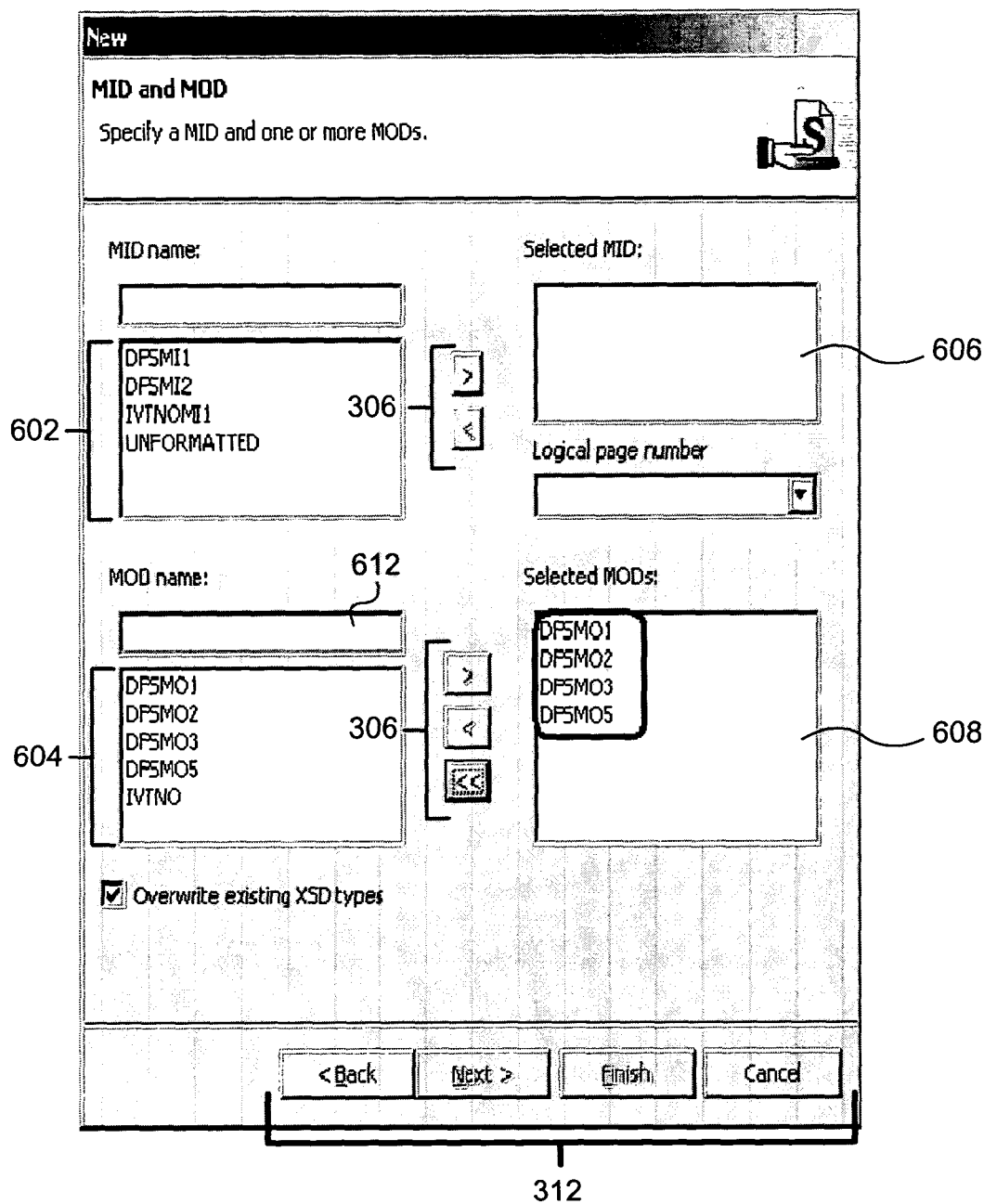
FIG. 6A is a schematic block diagram illustrating a designation module of a user interface in accordance with the present invention.

FIG. 6A illustrates a designation module 600 of the user interface. The designation module 600 assists the user in designating a MID and one or more associated MODs. Typically, the user is a software developer assigned to provide certain features and functions of an MFS-based IMS application as web services through a web services interface. However, the user may be unfamiliar with the MFS-based IMS application and all of the MIDs/MODs that are supported. Reasons for the user's lack of familiarity and experience may vary.

Instead, the user may have learned the name of the MID that provides the inputs necessary to complete the web service but know nothing about which MODs provide the outputs necessary to properly complete the web services transaction. Typically, in defining a web service, only one MID may be selected. With the designation module 600, such a user is able to successfully complete the development of the XMI files necessary to define the web services interface.

The designation module 600 displays a MID list 602 and a MOD list 604. The available MIDs and available MODs are represented by names in the lists 602, 604. A user may select a MID and one or more MODs from the lists 602 and transfer these to a selected MID pane 606 and a selected MOD pane 608. The user may use the appropriate selection buttons 306 that operate in similar manner to those described above in relation to FIG. 3.

MID names may be foreign to a user tasked with developing a web services interface for an MFS-based IMS application. To facilitate identification of a desired MID/MOD, the designation module 600 orders the MID list 602 and MOD list 604. In one embodiment, the lists 602, 604 are ordered alphabetically. In another embodiment, the lists 602, 604 may be ordered according to the most frequently selected. Of course the lists 602, 604 may be ordered according to other criteria as well.

As mentioned above, a web services interface is restricted to a single MID. Consequently, the designation module 600 allows only one MID to be listed in the selected MID pane 606. In one embodiment, if a user adds another MID from the MID list 602, an existing MID in the selected MID pane 606 is replaced with the newly selected MID.

Each MID is associated with one or more MODs. Typically, unless the user is highly experienced with MFS-based IMS application, the user does not know which MODs should be included with which MIDs to define a proper web services interface. Accordingly, the designation module 600 automatically selects MODs associated with a user-selected MID.

In one embodiment, the designation module 600 automatically populates the selected MOD pane 608 with MODs associated with a selected MID. Alternatively, the designation module 600 may highlight the associated MODs in the MOD list 602 such that the user may activate the proper selection button 306 to populate the selected MOD pane 608. In yet another embodiment, the designation module 600 prevents a user from deselecting MODs associated with a selected MID. Alternatively, the user may be able to deselect certain MODs.

Typically, an MFS-based IMS application requires certain default MODs for a suitable interface. In the context of terminals, this means there is a default set of MODs that each terminal should support. In a web services context, this means that these same default MODs should be selected regardless of the MID selected.

For example, four MODs are default MODs that should always be selected such that the MFS-based IMS application may properly communicate error conditions to an end-user or client application. In the illustrated embodiment, these default MODs (DFSMO1, DFSMO2, DFSMO3, DFSMO5—circled within the selected MODs pane 608) are automatically selected. The user is not required to remember to select these default MODs. Of course, default MODs may also include MODs other than those used for error reporting.

The designation module 600 may populate the selected MODs pane 608 with the default MODs when the designation module 600 is first presented. Alternatively, the default MODs may be selected in response to a user selecting a MID. In one embodiment, a user is unable to deselect the default MODs.

Figure 6B:
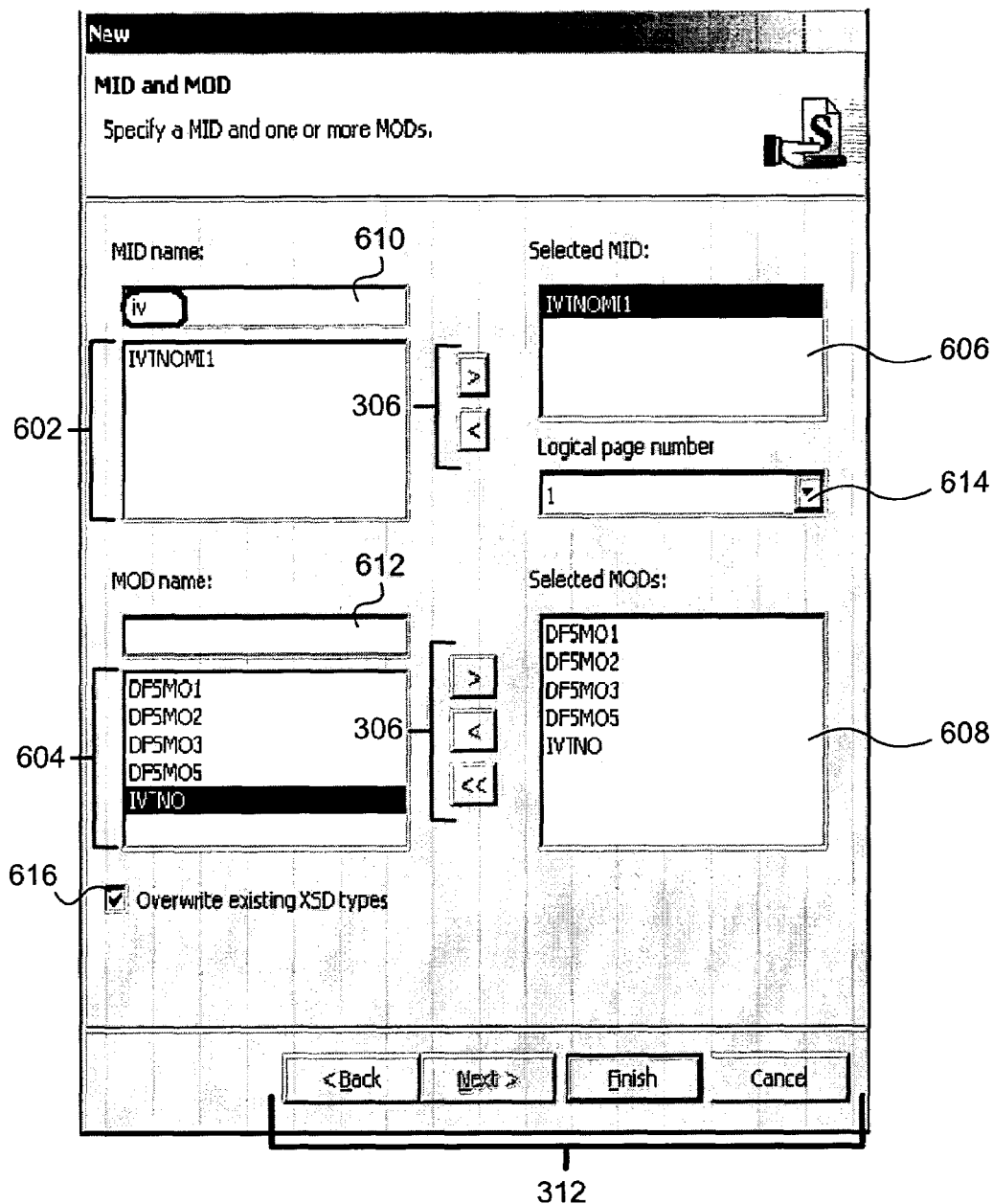
FIG. 6B is a schematic block diagram illustrating an alternative view of the designation module of FIG. 6A.

FIG. 6B illustrates an alternative view of the designation module 600 illustrated in FIG. 6A. The designation module 600 may include a MID list filter and a MOD list filter. The filters may be activated by a user supplying criteria within a MID criteria box 610 and a MOD criteria box 612.

In one embodiment, as the user types in the first few letters of a MID/MOD, the corresponding MID/MOD list 602, 604 is filtered to list only those MIDs/MODs beginning with the same letters as those typed in the MID/MOD criteria box 610, 612. Similarly, if the set of letters in the MID/MOD criteria box 610, 612 is modified, the corresponding MID/MOD list 602, 604 is similarly modified. For example, if the letters are deleted, the MID/MOD list 602, 604 lists the original set of MIDs/MODs.

As mentioned above, the MID list 602 and MOD list 604 may include hundreds of items. Filtering MID/MOD lists 602, 604 assists a user in locating a specific MID and associated MODs. In one embodiment, filtering of the MOD list 604 does not affect any required or default MODs. The default MODs may remain within the MOD list 604 regardless of an entry in the MOD criteria box 612.

Typically, MIDs are divided into one or more logical pages. Each logical page represents a set of input fields. The user is able to designate which logical page is to be used for the developed web service. Typically, the first logical page is designated. In one embodiment, the designation module 600 automatically populates a drop-down list 614 with the proper number of logical pages for a selected MID. In addition, the designation module 600 may automatically select the first logical page in the drop-down list 614. Of course, if needed a user may change the logical page.

In certain embodiments, an XML Schema Definition (XSD) check box 616 is provided and automatically checked. In select embodiments, selecting the check box 616 provides an indicator to a tool such as a WSD tool 120. The indicator may cause the WSD tool 120 to generate new XSD files that define the data types in the WSDL files 122.

Once the user has selected a MID, MID logical page, and associated MODs, including default MODs, a finish control button 312 is activated. If the user activates the finish control button 312, the components for defining the web services interface to an MFS-based IMS application are defined.

In one embodiment, the user interface assembles the selected MID, MID logical page, associated MODs, and a selected device type and device feature combination into a web services interface. In one embodiment, the user interface assembles the web services interface by executing a tool for defining a web services interface from the selected MID, MID logical page, associated MODs, and selected device type and device feature combination. In one embodiment, the tool defines the web services interface through one or more Web Services Description Language (WSDL) files. Alternatively, the selected MID, MID logical page, associated MODs, and selected device type and device feature combination are assembled into a parameter set that may be used later to generate WSDL files.

Figure 7:
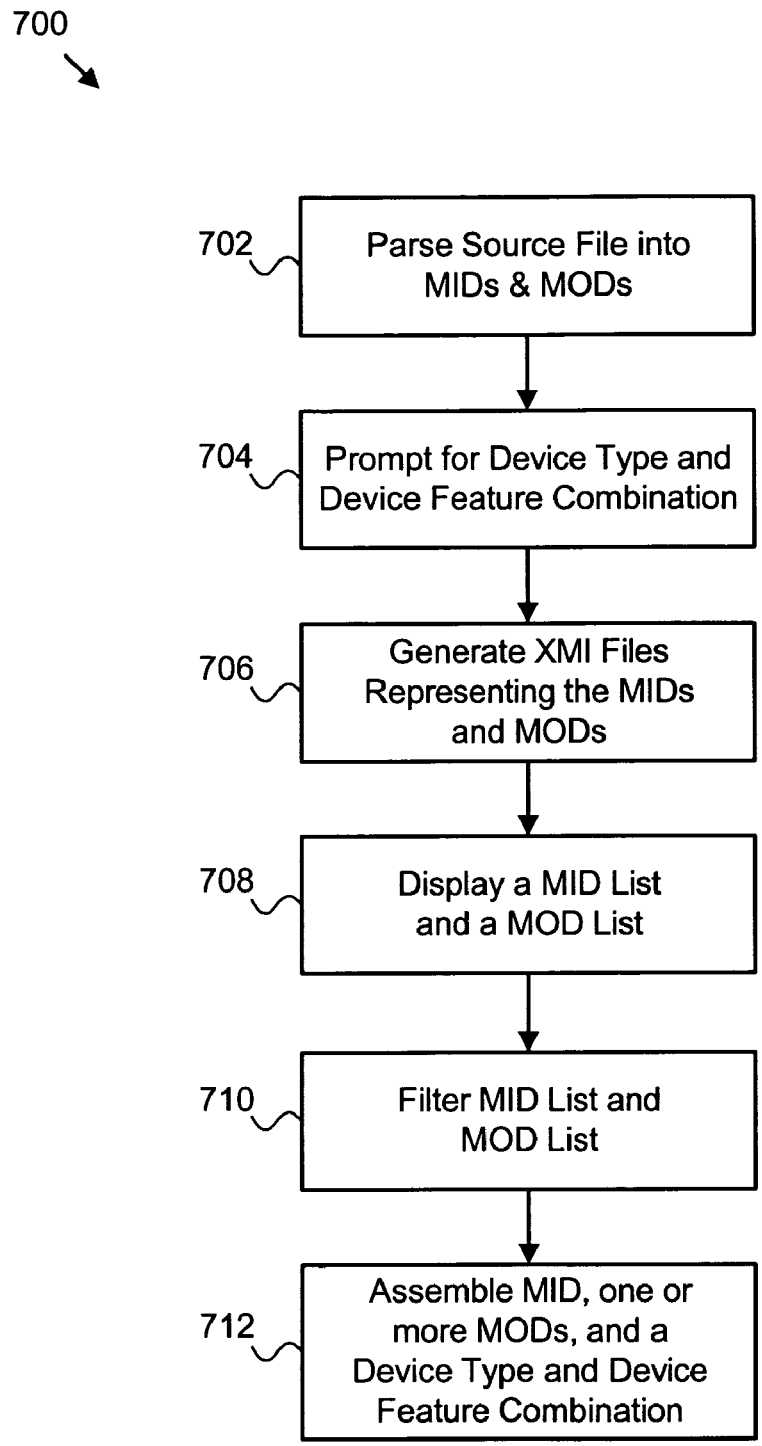
FIG. 7 is a schematic flow chart diagram illustrating a method for defining a web services interface for an MFS-based IMS application according to one embodiment of the present invention.

FIG. 7 illustrates a method 700 for defining a web services interface for an MFS-based IMS application. In selected embodiments, the method 700 may be conducted using the system and apparatus of FIGS. 1-6B. The method 700 automates and facilitates selection of a MID and the associated MODs for a web services interface. The method 700 begins by parsing 702 an MFS-based IMS source file into MIDs and MODs. Preferably, parsing the source file may include storing the associations between MIDs/DIFs and MODs/DOFs defined in the source file. In certain circumstances, the source file may be converted to accommodate differences in encoding formats. Preferably, a plurality of encoding formats are supported.

Next, a user is prompted 704 to select a device type and device feature combination supported by the MIDs and MODs of an MFS-based IMS application. The device type and feature specifies how data is to be formatted for display to an end user. Each input message and output message, i.e. MID and MOD, is associated with one or more available device type and feature combinations.

In certain embodiments, once a MID and associated MODs are selected, XMI files may be generated 706 that represent the MID and MODs for a given MFS-based IMS application. In one embodiment, a separate XMI file is generated 706 for each MID and each MOD.

Preferably, the selection of a device type and device feature combination reduces the number of MIDs/MODs displayed 708 in a MID list and a MOD list. Alternatively, all of the MIDs/MODs in the source file are displayed in the MID list and the MOD list. In certain embodiments, a user may filter 710 the MID list and MOD list by supplying certain criteria such as the beginning letters of a MID/MOD name. Preferably, selection of a MID causes associated MODs to also be selected. In addition, default MODs may also be automatically selected.

Finally, the selected MID, associated MODs, and a device type and device feature combination are assembled 712 to define a web services interface. In one embodiment, a WSDL file generator is initiated using the selected MID, associated MODs, and a device type and device feature combination. In another embodiment, the selected MID, associated MODs, and a device type and device feature combination are organized into a parameter set for use in defining the web services interface.

Figure 8:
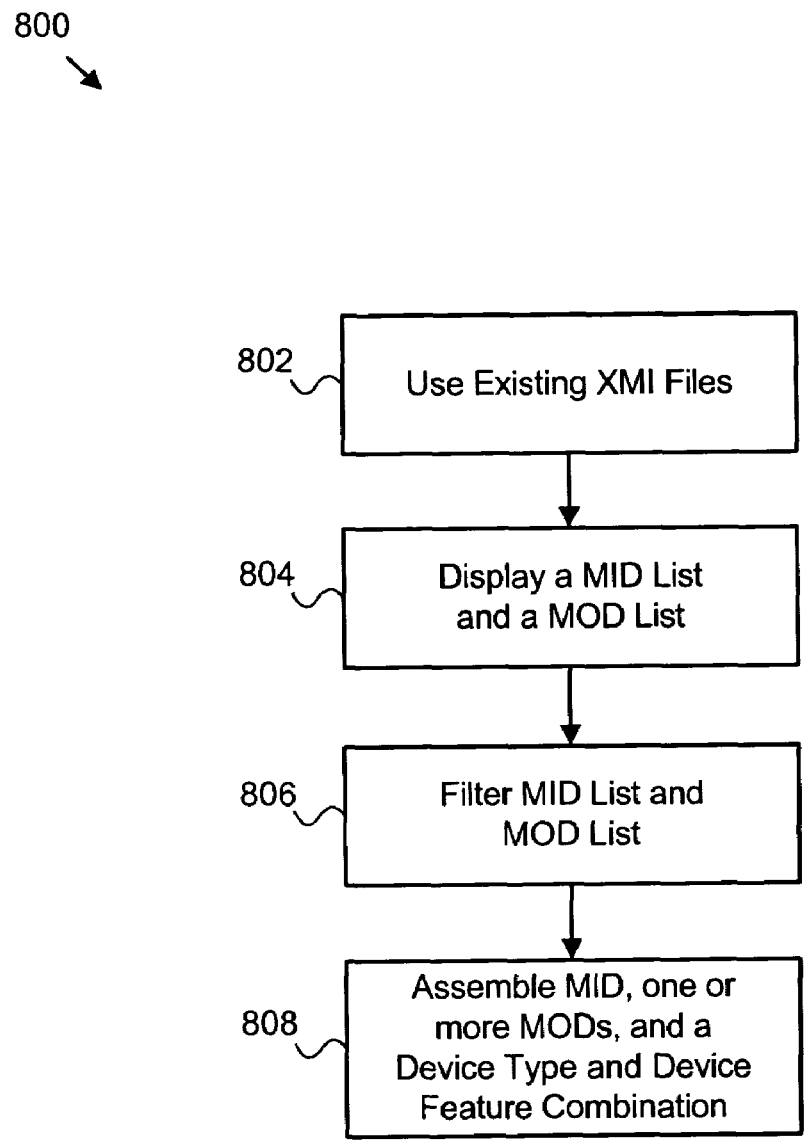
FIG. 8 is a schematic flow chart diagram illustrating a method for defining a web services interface for an MFS-based IMS application according to an alternative embodiment of the present invention.

FIG. 8 illustrates a method 800 for defining a web services interface for an MFS-based IMS application according to an alternative embodiment. As mentioned above, a web services interface may be defined using existing XMI files. The method 800 begins when a user indicates that existing XMI files for an MFS-based IMS application are to be used 802. The existing XMI files correspond to a previously selected device type and device feature combination.

Then, the method 800 proceeds in substantially the same manner as set forth in relation to FIG. 7. A MID list and MOD list are displayed 804. The MID list and MOD list are filtered 806. And, the selected MID, associated MODs, and a device type and device feature combination are assembled 808 to define a web services interface.

In summary, the present invention provides an apparatus, system, and method that allows a user who may be unfamiliar with MFS-based IMS applications to quickly and easily define a web services interface. The present invention automatically selects MODs associated with a selected MID. Selection of a MID and associated MODs allows features and functions of mature MFS-based IMS applications to be readily available for web applications through web services. The present invention facilitates generation of XMI files suitable for supporting a web services interface for an MFS-based IMS application. In addition, preexisting XMI files may be revised as needed to accommodate different MIDs/MODs.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A user interface executed on a display device that defines a web services interface of an MFS-based IMS application comprising:
   a first selection module configured to prompt a user to select a source file defining the Message Input Descriptions (MIDs) and Message Output Descriptions (MODs) of an MFS-based IMS application;
   a second selection module configured to prompt a user to select a device type and associated device feature supported by the MFS-based IMS application; and
   a designation module configure to prompt a user to designate a MID and one or more associated MODs for a web services interface of the MFS-based IMS application.

2. The user interface of claim 1, wherein the designation module automatically selects one or more associated MODs in response to user designation of a MID.

3. The user interface of claim 1, wherein designation module automatically selects one or more MODs for reporting error conditions.

4. The user interface of claim 1, wherein the designation module filters a MID list and a MOD list in response to user-defined criteria.

5. The user interface of claim 1, further comprising a generator configured to generate eXtended Markup Language Metadata Interchange (XMI) files representative of the designated MID and one or more associated MODs.

6. The user interface of claim 1, wherein the user interface comprises a Graphical User Interface (GUI).

7. The user interface of claim 1, wherein designation module orders the MID list and MOD list.

8. The user interface of claim 1, wherein the web services interface comprises one or more Web Services Description Language (WSDL) files.

9. The user interface of claim 1, further comprising a format module configured to format the source file in response to a user-defined encoding format.

10. The user interface of claim 1, wherein the source file comprises one or more eXtended Markup Language Metadata Interchange (XMI) files.

11. An apparatus that includes a processor and a memory device defining a web services interface of an MFS-based IMS application, comprising:
    a parser configured to parse a source file into one or more Message Input Descriptions (MIDs) and one or more Message Output Descriptions (MODs);
    a prompt module configured to prompt a user for a device type and device feature combination supported by the MIDs and MODs;
    a display module configured to display a MID list and a MOD list and automatically select one or more MODs associated with a user-selected MID; and
    an assembly module configured to assemble the user-selected MID, the associated MODs, and the user-selected device type and device feature combination into a web services interface.

12. The apparatus of claim 11, wherein the display module automatically selects one or more MODs for reporting error conditions.

13. The apparatus of claim 12, further comprising a filter module configured to filter the MID list and the MOD list in response to user-defined criteria.

14. The apparatus of claim 13, further comprising a generator configured to generate eXtended Markup Language Metadata Interchange (XMI) files representative of the MIDs and MODs.

15. The apparatus of claim 14, wherein the display module automatically selects the first logical page of the user-selected MID.

16. The apparatus of claim 15, wherein the display module orders the MID list and MOD list.

17. The apparatus of claim 16, wherein the web services interface comprises one or more Web Services Description Language (WSDL) files.

18. The apparatus of claim 17, further comprising a format module configured to format the source file in response to a user-defined encoding format.

19. The apparatus of claim 18, wherein the source file comprises one or more XMI files.

20. The apparatus of claim 19, wherein the parser is configured to import the source file.

21. An article of manufacture comprising a program storage medium readable by a processor and embodying one or more instructions executable by a processor to perform a method that defines a web services interface of an MFS-based IMS application, the method comprising:
    parsing an MFS-based IMS application source file into one or more Message input Descriptions (MIDs) and one or more Message Output Descriptions (MODs);
    prompting a user for a device type and device feature combination supported by the MIDs and MODs;
    displaying a MID list and a MOD list and automatically selecting one or more MODs associated with a user-selected MID; and assembling the user-selected MID, the associated MODs, and the user-selected device type and device feature combination into a web services interface.

22. The article of manufacture of claim 21, Further comprising automatically selecting one or more MODs for reporting error conditions.

23. The article of manufacture of claim 21, further comprising filtering the MID list and MOD list in response to user-defined criteria.

24. The article of manufacture of claim 21, further comprising generating eXtended Markup Language Metadata Interchange (XMI) files representative of the MIDs and MODs.

25. The article of manufacture of claim 21, further comprising automatically selecting the first logical page of the user-selected MID.

26. The article of manufacture of claim 21, further comprising ordering the MID list and MOD list.

27. The article of manufacture of claim 21, wherein the web services interface comprises one or more Web Services Description Language (WSDL) files.

28. The article of manufacture of claim 21, further comprising formatting the source file in response to a user-defined encoding format.

29. The article of manufacture of claim 21, wherein the source file comprises one or more eXtended Markup Language Metadata Interchange (XMI) files.

30. The article of manufacture of claim 21, further comprising importing the source file.

* * * * *